US010381902B2

(12) United States Patent
Fukushima et al.

(10) Patent No.: US 10,381,902 B2
(45) Date of Patent: Aug. 13, 2019

(54) INTEGRATED SYSTEM (71) Applicant: HONDA MOTOR CO., LTD., Tokyo (JP)

(72) Inventors: Tadahiro Fukushima, Wako (JP); Tsukasa Aiba, Wako (JP); Takahiro Hagimoto, Wako (JP); Takahide Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 606 days.

(21) Appl. No.: 15/008,446

(22) Filed: Jan. 28, 2016

(65) Prior Publication Data
US 2016/0218602 A1 Jul. 28, 2016

(30) Foreign Application Priority Data
Jan. 28, 2015 (JP) .................................. 2015-014491

(51) Int. Cl.
*H02K 11/33* (2016.01)
*H02K 11/30* (2016.01)
(Continued)

(52) U.S. Cl.
CPC ............. *H02K 11/33* (2016.01); *H02K 5/225* (2013.01); *H02K 7/006* (2013.01); *H02K 11/225* (2016.01);
(Continued)

(58) Field of Classification Search
CPC .......... H02K 11/33; H02K 5/22; H02K 5/225; H02K 47/20; H02K 5/04; H02K 5/00;
(Continued)

(56) References Cited

U.S. PATENT DOCUMENTS 6,166,498 A * 12/2000 Yamaguchi .............. B60K 6/26
180/65.235
2002/0043883 A1* 4/2002 Shimizu ............... H01R 13/405
310/71
(Continued)

FOREIGN PATENT DOCUMENTS

JP 2000-217205 8/2000
JP 2004-254359 9/2004
(Continued)

OTHER PUBLICATIONS

Japanese Office Action for corresponding JP Application No. 2015-014491, dated Oct. 2, 2018 (w/ machine translation).
(Continued)

*Primary Examiner* — Thomas Truong
*Assistant Examiner* — Alexander Moraza
(74) *Attorney, Agent, or Firm* — Mori & Ward, LLP (57) ABSTRACT

An integrated system includes a controller, a drive device, and a fastening supporting member. The controller has a controller connector. The drive device has a drive device connector which is connected to the controller connector so that the drive device is electrically coupled to the controller. Via the fastening supporting member, the controller and the drive device are maintained in an electrically coupled state in which the drive device connector is connected to the controller connector. At least part of the controller connector and the drive device connector, as viewed from a vertical direction, is disposed within an area from a first line segment which is perpendicular to a virtual line connecting a center of gravity of the controller and the fastening supporting member and which passes the center of gravity to a second line segment which is perpendicular to the virtual line and which passes the fastening supporting member.

16 Claims, 10 Drawing Sheets (51) Int. Cl.
*B60L 50/50* (2019.01)
*H02K 5/22* (2006.01)
*H02K 7/00* (2006.01)
*H02K 16/00* (2006.01)
*H02K 11/225* (2016.01)
*B60L 50/61* (2019.01)

(52) U.S. Cl.
CPC .............. *H02K 16/00* (2013.01); *B60L 50/61* (2019.02); *H02K 2213/03* (2013.01); *Y02T 10/6217* (2013.01); *Y02T 10/641* (2013.01); *Y02T 10/7077* (2013.01)

(58) Field of Classification Search
CPC ...... H02K 11/00; H02K 7/006; H02K 11/225; H02K 11/30; H02K 16/00; B60K 1/00; B60K 1/02; B60K 1/04; B60K 2001/006; B60K 2006/266; B60K 6/00; B60K 6/405; H01R 13/46; H01R 12/70; H01R 12/7005; H01R 12/67; H01R 12/65; H01R 12/58; H01R 12/57; H01R 12/55; H01R 12/515; B60L 11/02; B60L 11/04; B60L 11/06; B60L 11/08; B60L 11/10; H02P 5/00; H02P 5/60; H02P 5/68; H02P 5/74
USPC ........... 310/71, 68 D, 112, 113, 89; 903/930, 903/952; 361/622; 318/34
See application file for complete search history.

(56) References Cited

U.S. PATENT DOCUMENTS

| | | | | |
|---|---|---|---|---|
| 2009/0206709 | A1* | 8/2009 | Kakuda ................. | B60K 6/405 310/68 D |
| 2009/0256437 | A1* | 10/2009 | Miura ................... | H02K 5/225 310/71 |
| 2010/0175933 | A1* | 7/2010 | Yoshida .................. | B60K 6/26 180/65.1 |
| 2011/0235977 | A1* | 9/2011 | Yamada ............... | H01R 13/621 385/76 |
| 2012/0015546 | A1* | 1/2012 | Yamaguchi ........... | H01R 13/05 439/370 |
| 2013/0137303 | A1* | 5/2013 | Yazaki .................. | H02K 5/225 439/625 |
| 2014/0306563 | A1* | 10/2014 | Oyama .................. | H02M 1/12 310/71 |
| 2016/0039276 | A1* | 2/2016 | Takahashi ............ | B60L 15/007 180/65.21 |

FOREIGN PATENT DOCUMENTS

| | | |
|---|---|---|
| JP | 2010-225488 | 10/2010 |
| JP | 2012-170177 | 9/2012 |
| JP | 2013-150472 | 8/2013 |
| JP | 2013-211938 | 10/2013 |

OTHER PUBLICATIONS

Japanese Office Action for corresponding JP Application No. 2015-014491 dated May 14, 2019 (w/ English machine translation).

* cited by examiner

INTEGRATED SYSTEM

CROSS-REFERENCE TO RELATED APPLICATIONS

The present application claims priority under 35 U.S.C. § 119 to Japanese Patent Application No. 2015-014491, filed Jan. 28, 2015, entitled "Integrated Unit." The contents of this application are incorporated herein by reference in their entirety.

BACKGROUND

1. Field

The present disclosure relates to an integrated system.

2. Description of the Related Art

There is known an integrated unit for use in a hybrid vehicle using an internal combustion engine and an electric motor as a driving source and an electric vehicle using an electric motor as a driving source in which the electric motor and a power control unit that controls the electric motor are integrated with each other through disposition of the power control unit on the electric motor (see, for example, Japanese Unexamined Patent Application Publications Nos. 2013-150472 and 2012-170177).

Japanese Unexamined Patent Application Publication No. 2013-150472 discloses that an inverter that controls a motor drive unit is mounted on the motor drive unit from above and bolted into a single unit. Japanese Unexamined Patent Application Publication No. 2012-170177 discloses that, when an inverter is mounted on an electric motor, a bus bar extending from the electric motor and an inverter contact portion facing the bus bar are connected to each other.

SUMMARY

According to one aspect of the present invention, an integrated unit includes a control unit and a controlled unit. The control unit has a control unit connector. The controlled unit has a controlled unit connector to be fitted into the control unit connector and is electrically coupled to the control unit by causing the control unit connector and the controlled unit connector to be fitted into each other. The control unit connector and the controlled unit connector are disposed between the control unit and the controlled unit. The control unit is disposed on a top surface of the controlled unit. The control unit and the controlled unit are held in a coupled state in which electrical coupling is accomplished by a fastening supporting member. At least part of the control unit connector and the controlled unit connector, as viewed from a vertical direction, is disposed within an area through which a line segment passes, the line segment being perpendicular to a virtual line connecting a center of gravity of the control unit and the fastening supporting member.

According to another aspect of the present invention, an integrated system includes a controller, a drive device, and a fastening supporting member. The controller has a controller connector. The drive device has a top surface on which the controller is disposed. The drive device has a drive device connector which is connected to the controller connector so that the drive device is electrically coupled to the controller. The controller connector and the drive device connector are disposed between the controller and the drive device. Via the fastening supporting member, the controller and the drive device are maintained in an electrically coupled state in which the drive device connector is connected to the controller connector. At least part of the controller connector and the drive device connector, as viewed from a vertical direction, is disposed within an area from a first line segment which is perpendicular to a virtual line connecting a center of gravity of the controller and the fastening supporting member and which passes the center of gravity to a second line segment which is perpendicular to the virtual line and which passes the fastening supporting member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A hybrid vehicle drive unit as an integrated unit (integrated system) according to one embodiment of the present application will be described below with reference to the attached drawings.

Figure 1:
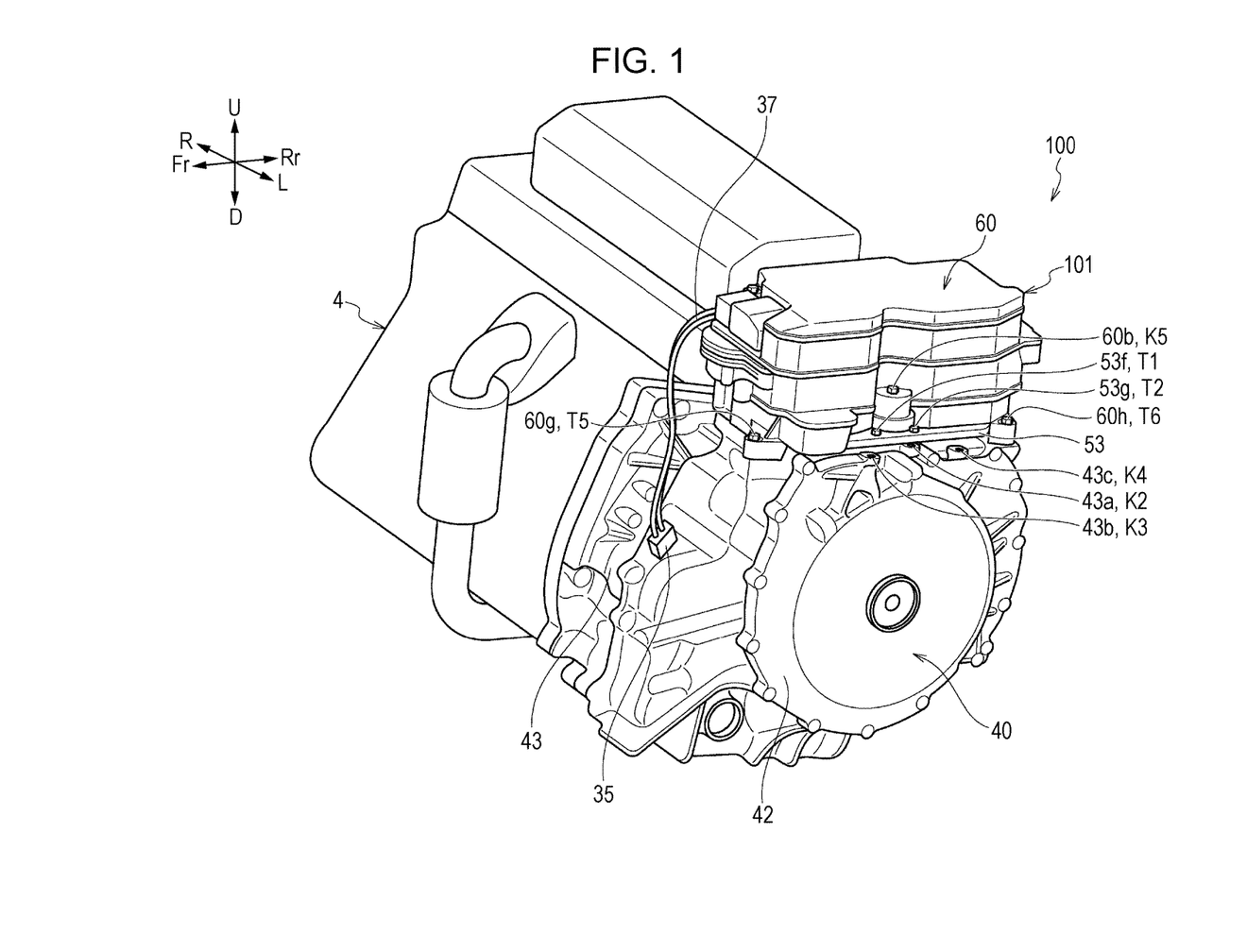
FIG. 1 is a perspective view of a hybrid vehicle drive unit as an integrated unit according to one embodiment of the present application.
Figure 2:
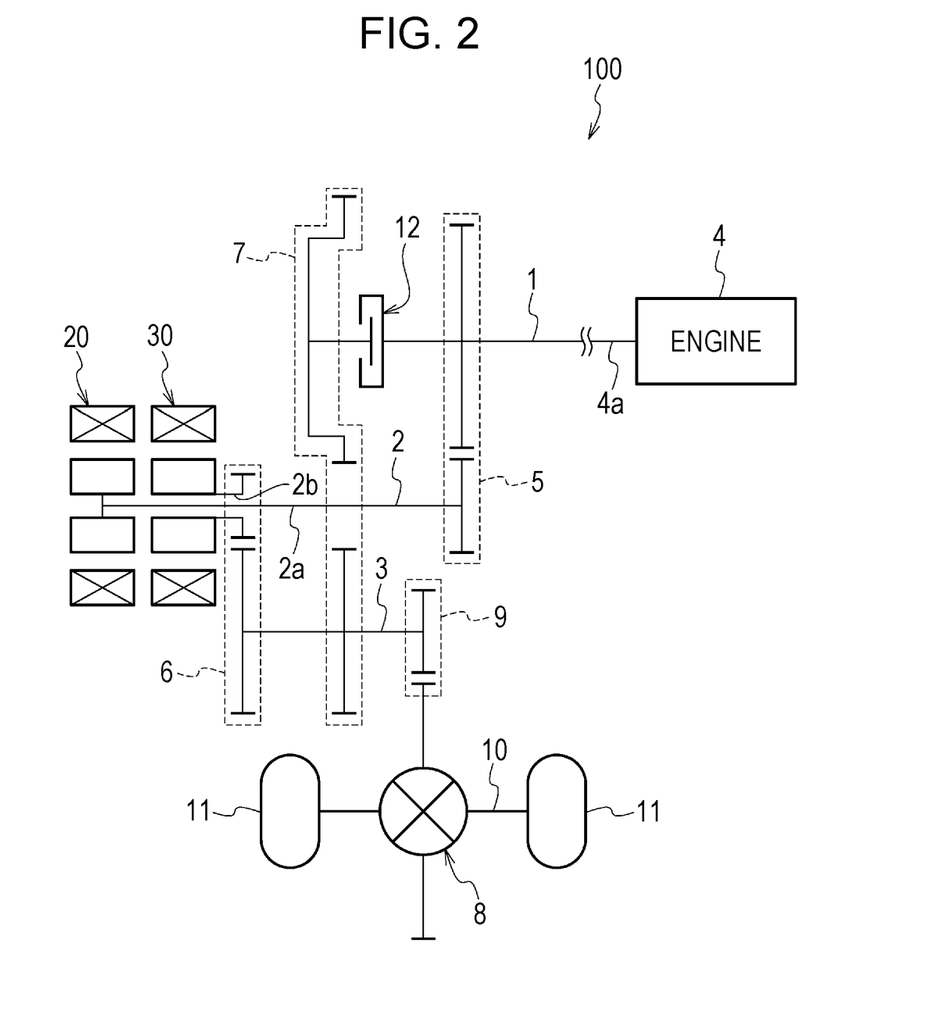
FIG. 2 is a block diagram of a hybrid vehicle drive unit of FIG. 1.
Figure 3:
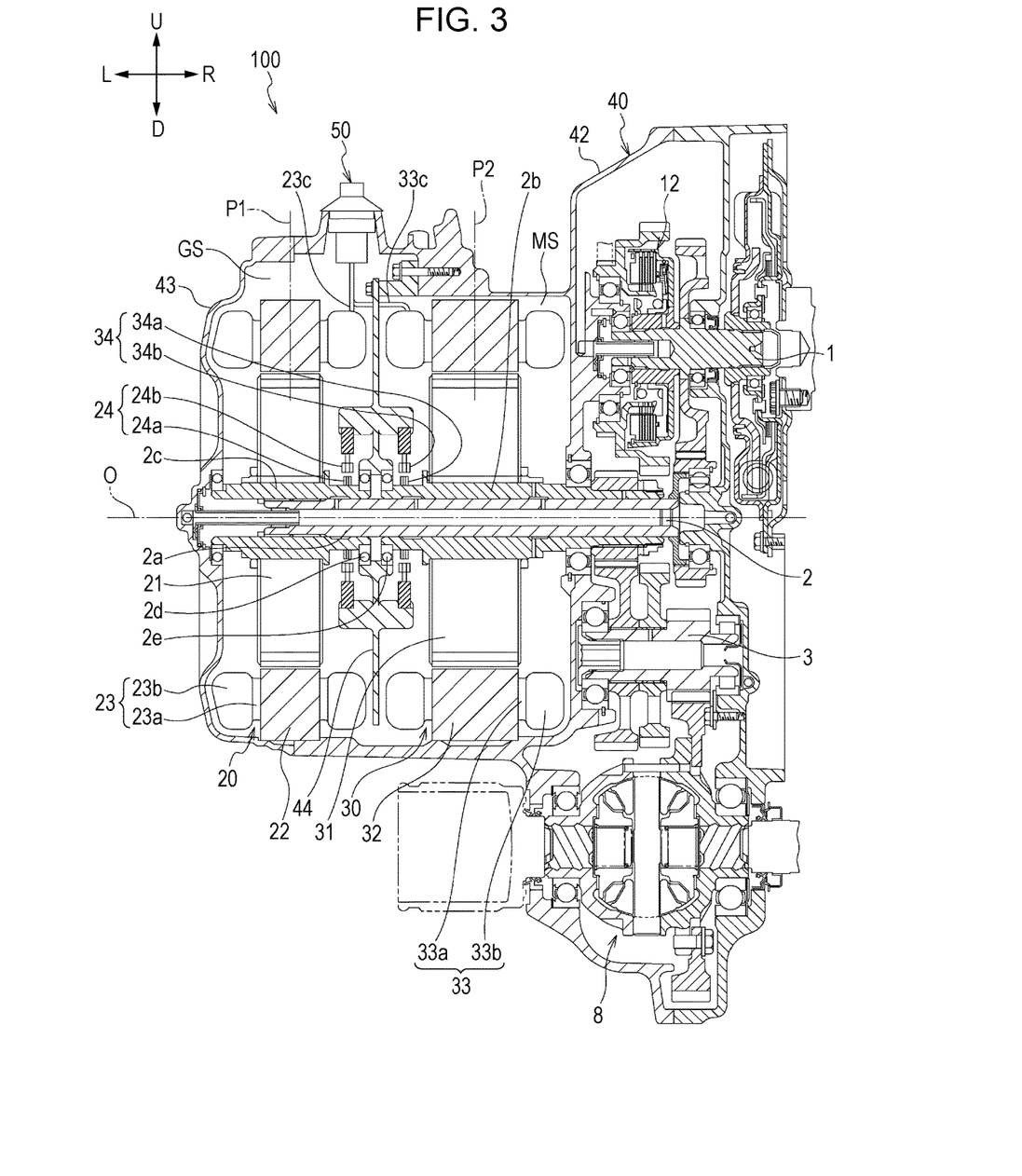
FIG. 3 is a cross-sectional view showing an internal structure of a drive unit casing of a hybrid vehicle drive unit of FIG. 1.

As shown in FIGS. 1 to 3, in a hybrid vehicle drive unit 100 according to one embodiment of the present application, a drive unit (drive device) 101 having a substantially cylindrically-shaped drive unit casing 40 that has a generator 20 and an electric motor 30 housed therein and an engine 4 are disposed side-by-side in an engine compartment (not illustrated), and a power control unit (controller) 60 that controls the generator 20 and the electric motor 30 is mounted on the drive unit casing 40. In FIG. 1, references to "Fr", "Rr", "L", "R", "U", and "D" are relative to a driver's position, representing the vehicle front, vehicle rear, left, right, upside, and downside, respectively.

As shown in FIGS. 2 and 3, an input shaft 1, an intermediate shaft 2, and an output shaft 3 are disposed inside the drive unit casing 40 so as to be parallel to one another. The intermediate shaft 2 has an inner circumferential shaft 2a surrounded by an outer circumferential shaft 2b so as to be relatively rotatable. In the following descriptions, the direction of the axis refers to the direction parallel to the axis of rotation of the input shaft 1, the intermediate shaft 2, and the output shaft 3. The hybrid vehicle drive unit 100 is disposed in the engine compartment in such a manner that the direction of the axis is in the breadthwise (crosswise) direction of the vehicle and that the direction perpendicular to the direction of the axis is the longitudinal direction of the vehicle.

The input shaft 1 connected to a crankshaft 4a of the engine 4 is connected via a generator drive gear pair 5 to the inner circumferential shaft 2a having the generator 20 provided on its axis. The outer circumferential shaft 2b having the electric motor 30 provided on its axis is connected to the output shaft 3 via a motor drive power transmission gear pair 6, while the input shaft 1 and the output shaft 3 are connected to each other via an engine drive power transmission gear pair V. The output shaft 3 and a differential gear unit 8 are connected to each other via a final gear pair 9, while the differential gear unit 8 is connected to drive wheels 11, 11 via a differential shaft 10. In addition, the input shaft 1 is provided with a clutch 12 that connects or disconnects drive power transmitted between the input shaft 1 and the output shaft 3 via the engine drive power transmission gear pair 7.

With this arrangement, the hybrid vehicle drive unit 100 has a transmission path through which the drive power of the electric motor 30 is transmitted to the drive wheels 11, 11 to drive the vehicle and another transmission path through which the drive power of the engine 4 is transmitted to the wheels 11, 11 to drive the vehicle. The vehicle is driven through the use of any one or the combined use of the two transmission paths.

When an attempt is made to use the transmission path through which the drive power of the electric motor 30 is transmitted to the drive wheels 11, 11 to drive the vehicle, the engine 4 is operated with the clutch 12 disengaged. Engine drive power input to the inner circumferential shaft 2a of the intermediate shaft 2 from the input shaft 1 via the generator drive gear pair 5 rotates the inner circumferential shaft 2a and the generator 20 secured to the inner circumferential shaft 2a as a unit, thereby generating electric power through the generator 20. Upon receiving the electric power generated by the generator 20, the electric motor 30 secured to the outer circumferential shaft 2b that surrounds the inner circumferential shaft 2a so as to be relatively rotatable rotates the outer circumferential shaft 2b and transmits the drive power to the output shaft 3 through the motor drive power transmission gear pair 6. The drive power transmitted to the output shaft 3 is transmitted to the drive wheels 11, 11 through the final gear pair 9, the differential gear unit 8, and the differential shaft 10. By doing this, all of the drive power of the engine 4 is converted into electric power by the generator 20, thereby enabling so-called series operation.

On the contrary, when an attempt is made to use the transmission path through which the drive power of the engine. 4 is transmitted to the wheels 11, 11 to drive the vehicle, the engine 4 is operated with the clutch 12 engaged. Engine drive power input through the input shaft 1 is transmitted to the output shaft 3 through the engine drive power transmission gear pair 7 and then transmitted to the drive wheels 11, 11 through the final gear pair 9, the differential gear unit 8, and the differential shaft 10. At this time, since the input shaft 1 and the inner circumferential shaft 2a are normally connected to each other via the generator drive gear pair 5, electric power is generated by the generator 20 and the thus generated electric power is used to rotate the electric motor 30, thereby enabling parallel operation as well. In addition, only the drive power of the engine 4 can be used to run the vehicle by subjecting the generator 20 and the electric motor 30 to zero torque control to minimize drag loss.

Next, the disposition of the generator 20 and the electric motor 30 in the drive unit casing 40 according to the embodiment is specifically described below with reference to FIG. 3.

The drive unit casing 40 according to the embodiment consists of first and second casings 42, 43 that are arranged in this order from the side of the engine 40 and has the input shaft 1, the intermediate shaft 2, and the output shaft 3 disposed therein so as to be parallel to one another. As described above, the intermediate shaft 2 has the inner circumferential shaft 2a and the outer circumferential shaft 2b. The electric motor 30 is connected to the outer circumferential shaft 2b, while the generator 20 is connected to the inner circumferential shaft 2a via a spline-coupled connecting shaft 2c.

In other words, the generator 20 and the electric motor 30 are housed in the drive unit casing 40 so as to be arranged on the same axis of rotation O. A generator housing GS that has the generator 20 housed therein and a motor housing MS that has the electric motor 30 housed therein are separated by a partition wall 44 that rotatably supports the outer circumferential shaft 2b and the connecting shaft 2c via bearings 2d, 2e.

The generator 20 consists of a rotor 21 secured to the connecting shaft 2c and a stator 22 disposed so as to be opposed to the rotor 21. The stator 22 has coils 23 of three phases (U, V, and W phases) wrapped therearound. The coils 23 have coil windings 23a wrapped around teeth of the stator 22 and a coil transition portion 23b that couples the coil windings 23a to one another. The coil transition portion 23b projects from the stator 22 in the direction of the axis.

The electric motor 30 consists of a rotor 31 secured to the outer circumferential shaft 2b and a stator 32 disposed so as to be opposed to the rotor 31. The stator 32 has coils 33 of three phases (U, V, and W phases) wrapped therearound. The coils 33 have coil windings 33a wrapped around teeth of the stator 32 and a coil transition portion 33b that couples the coil windings 33a to one another. The coil transition portion 33b projects from the stator 32 in the direction of the axis.

A generator resolver 24 that detects a rotational angle of the generator 20 and an electric motor resolver 34 that detects a rotational angle of the electric motor 30 are disposed in the direction of the axis between the generator 20 and the electric motor 30 in the inner-diameter side of the coil transition portion 23b of the generator 20 and the coil transition portion 33b of the electric motor 30.

The generator resolver 24 has a resolver rotor 24a secured to the connecting shaft 2c and a resolver stator 24b disposed so as to be opposed to the resolver rotor 24a, while the electric motor resolver 34 has a resolver rotor 34a secured to the outer circumferential shaft 2b and a resolver stator 34b disposed so as to be opposed to the resolver rotor 34a. The resolver stators 24b, 34b of the generator resolver 24 and the electric motor resolver 34 are supported by the above-mentioned partition wall 44. This arrangement enables the utilization of a dead space in the inner-diameter side of the coil transition portions 23b, 33b to dispose the generator resolver 24 and the electric motor resolver 34 and also enables the partition wall 44 to be shared as a wall for supporting the generator resolver 24 and the electric motor resolver 34. Coils (not illustrated) drawn from the resolver stators 24b, 34b are connected to a resolver connector 35 disposed on the front surface of the drive unit casing 40. The resolver connector 35 and the power control unit 60 are connected to each other via a harness 37.

Figure 4:
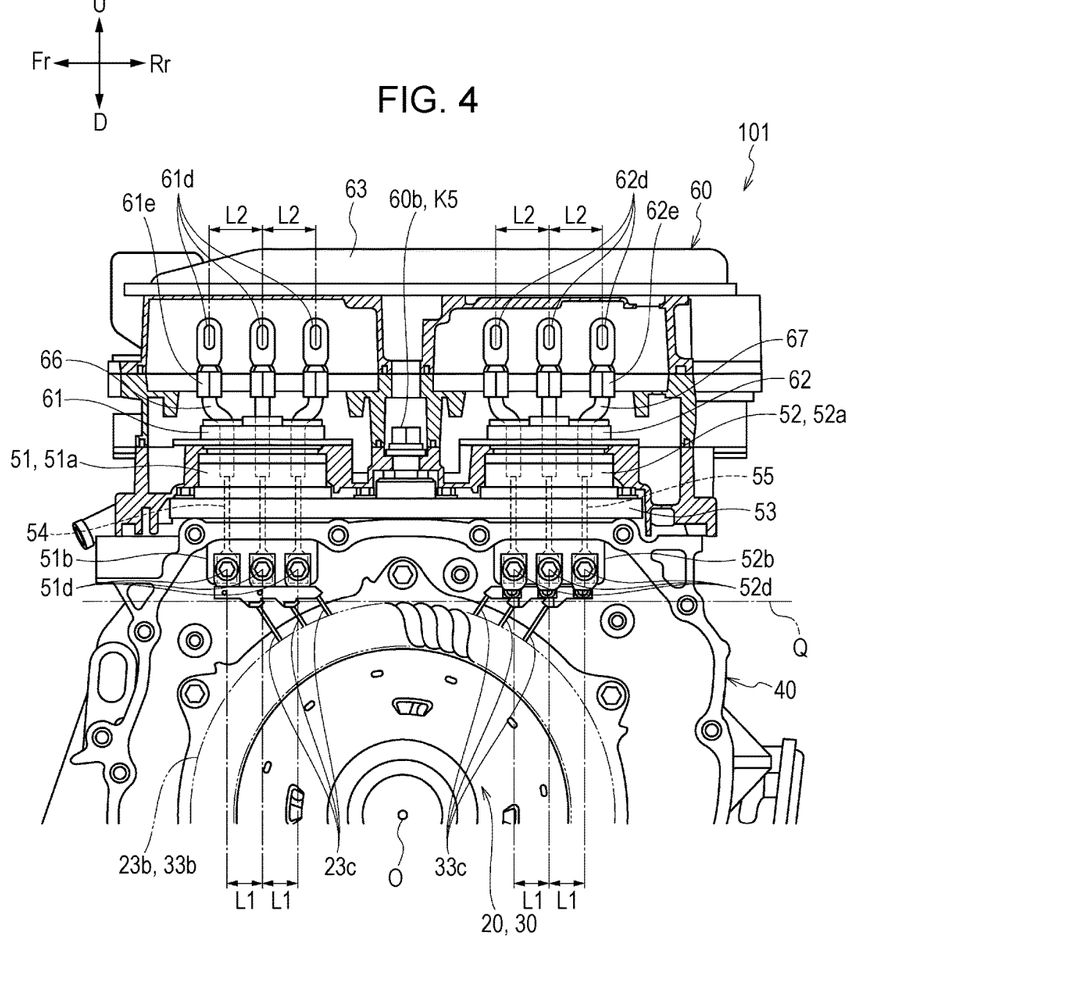
FIG. 4 is a cross-sectional view showing an internal structure of a drive unit casing and a power control unit of a hybrid vehicle drive unit of FIG. 1.

As shown in FIGS. 3 and 4, the coils 23 for the various phases (U, V, and W phases) in the generator 20 are connected at one end thereof to one another. The other ends are drawn as coil terminals 23c from the stator 22 and are connected to a casing-side generator connector 51 inside the drive unit casing 40. In addition, the coils 33 for the various phases in the electric motor 30 are connected at one end thereof to one another. The other ends are drawn as coil terminals 33c from the stator 32 and are connected to a casing-side motor connector 52 inside the drive unit casing 40.

The casing-side generator connector 51 and the casing-side motor connector 52 are disposed between the center P1 of the generator 20 and the center P2 of the electric motor 30 in the direction of the axis so as to be perpendicular to the axis of rotation O. The casing-side generator connector 51 and the casing-side motor connector 52 according to the embodiment are coupled to each other via a connector supporting member 53, thereby forming an integrated casing-side connector (drive device connector) 50 that is secured to the circumferential surface of the substantially cylindrically-shaped drive unit casing 40 via the connector supporting member 53.

Specifically, as shown in FIGS. 4 through 7C, the casing-side generator connector 51 and the casing-side motor connector 52 according to the embodiment have connectors 51a, 52a projecting from the upper surface of the plate-like connector supporting member 53 and coil connecting portions 51b, 52b projecting from the lower surface of the connector supporting member 53. The connectors 51a, 52a have three casing-side connecting conductors 54 housed therein that correspond to the U, V, and W phases. Likewise, the coil connecting portions 51b, 52b have three casing-side connecting conductors 55 housed therein that correspond to the U, V, and W phases. The connectors 51a, 52a are formed into the shape of a cylindroid in which connector terminals 51c, 52c for the three phases formed at ends of the casing-side connecting conductors 54, 55 are disposed. The coil connecting portions 51b, 52b are also formed into the shape of a cylindroid. Coil connecting terminals 51d, 52d for the three phases formed at the other ends of the casing-side connecting conductors 54, 55 are disposed on an outside surface of the coil connecting terminals 51d, 52d.

Figure 7A:
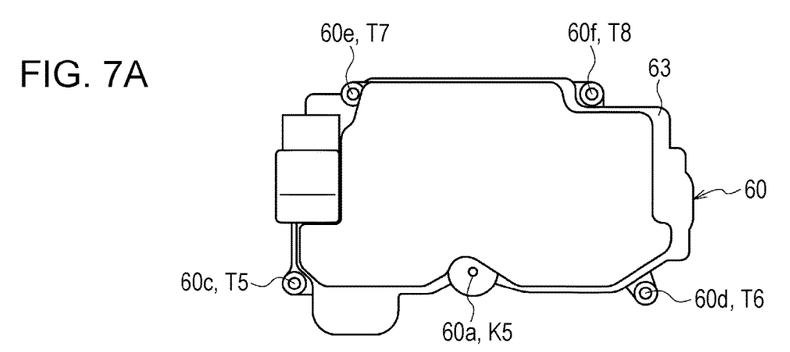
FIG. 7A is a plan view of a power control unit.
Figure 7B:
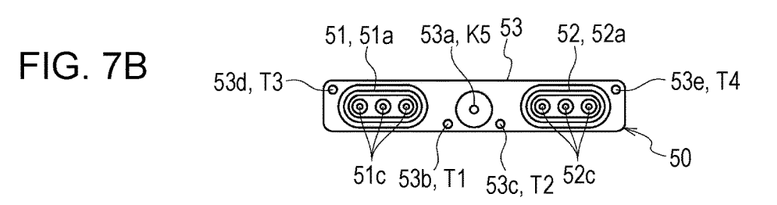
FIG. 7B is a plan view of a casing-side connector.
Figure 7C:
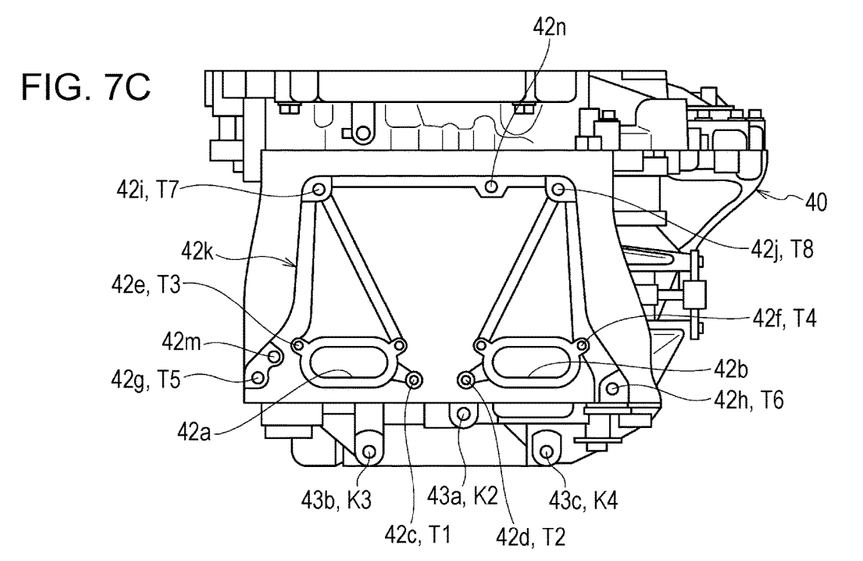
FIG. 7C is a plan view of a drive unit casing.

The connector supporting member 53 has through-holes 53b, 53c, 53d, 53e formed therein through which bolts 53f, 53g, 53h, 53i are inserted and fastened to fastener holes 42c, 42d, 42e, 42f formed in the drive unit casing 40, thereby forming bolt fastening points T1, T2, T3, T4 between the connector supporting member 53 and the drive unit casing 40.

Figure 10:
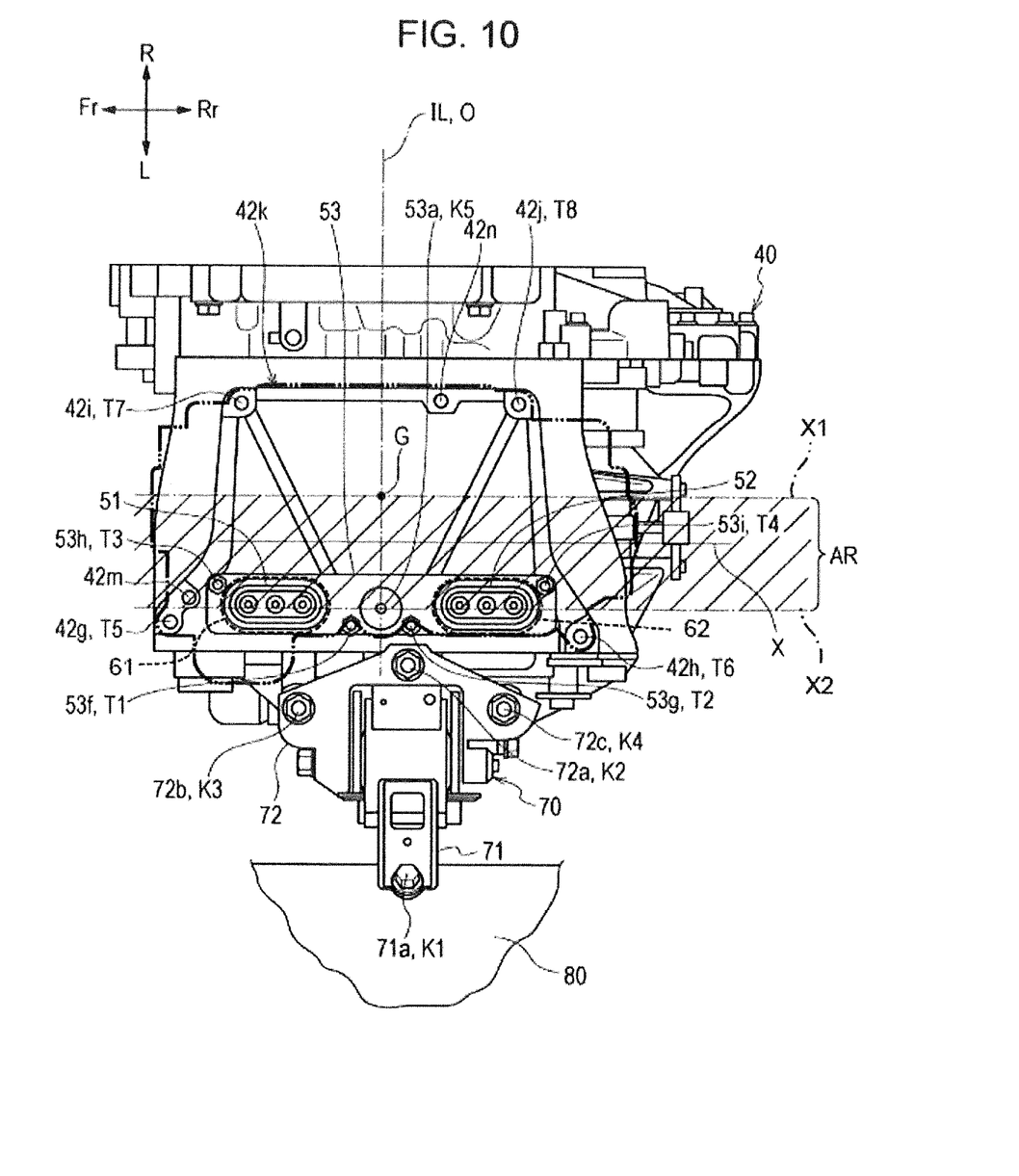
FIG. 10 is a plan view showing a hybrid vehicle drive unit of FIG. 1 having a mounting member mounted on a drive unit casing thereof.

With this arrangement, the casing-side generator connector 51 and the casing-side motor connector 52 according to the embodiment are mounted on the drive unit casing 40 in such a manner that the connector supporting member 53 lies along the upper surface of the drive unit casing 40 and that the coil connecting portions 51b, 52b are fitted into connector holes 42a, 42b formed in the upper surface of the drive unit casing 40, thereby forming part of the drive unit 101. With this arrangement, the casing-side generator connector 51 and the casing-side motor connector 52, when viewed from the direction of the axis, are disposed so as to lie along a tangent line Q passing through the upper end of the generator 20 and the electric motor 30, as shown in FIG. 4. In addition, the casing-side generator connector 51 and the casing-side motor connector 52, when viewed from the vertical direction, are disposed longitudinally such that the axis of rotation O of the rotor 21 of the generator 20 and the rotor 31 of the electric motor 30 lies therebetween, as shown in FIG. 10. Furthermore, in the drive unit casing 40, the coil terminals 23c for the various phases of the generator 20 are connected to the coil connecting terminals 51d of the casing-side generator connector 51, while the coil terminals 33c for the various phases of the electric motor 30 are connected to the coil connecting terminals 52d of the casing-side motor connector 52 (see FIG. 4).

Figure 8:
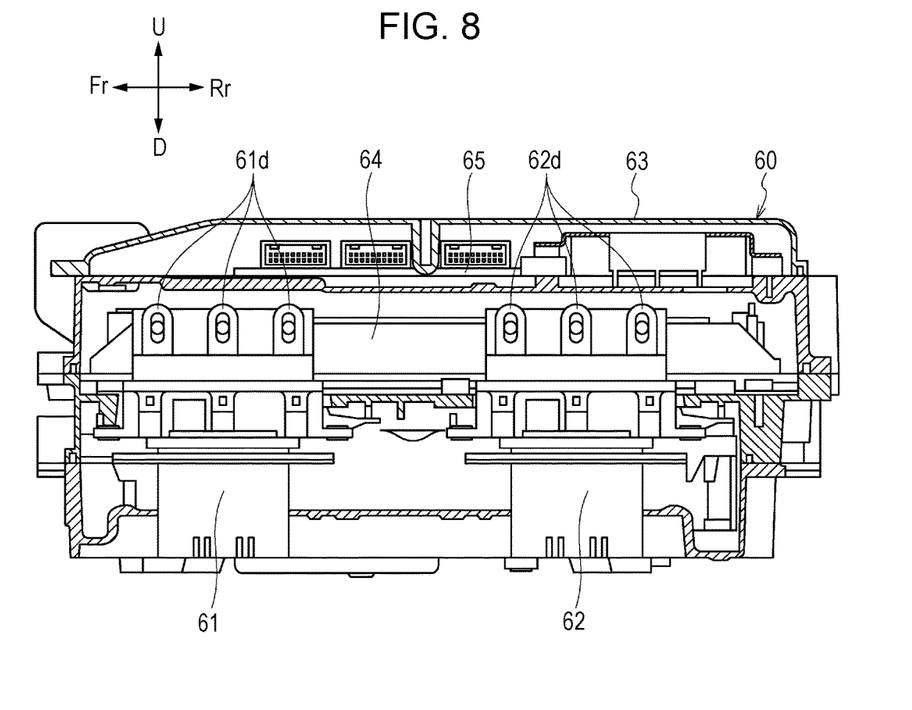
FIG. 8 is a cross-sectional view showing a power control unit of a hybrid vehicle drive unit of FIG. 1.

As shown in FIG. 8, the power control unit 60 according to the embodiment consists of a substantially box-shaped unit casing 63 having an inverter 64, a control unit (ECU) 65 that controls the inverter, and a current sensor (not illustrated) housed therein. The inverter 64 includes a generator inverter that is connected between a battery disposed outside the engine compartment and the generator 20 and that performs AC-DC voltage conversion and an electric motor inverter that is connected between the battery and the electric motor 30 and performs DC-AC voltage conversion.

Figure 9:
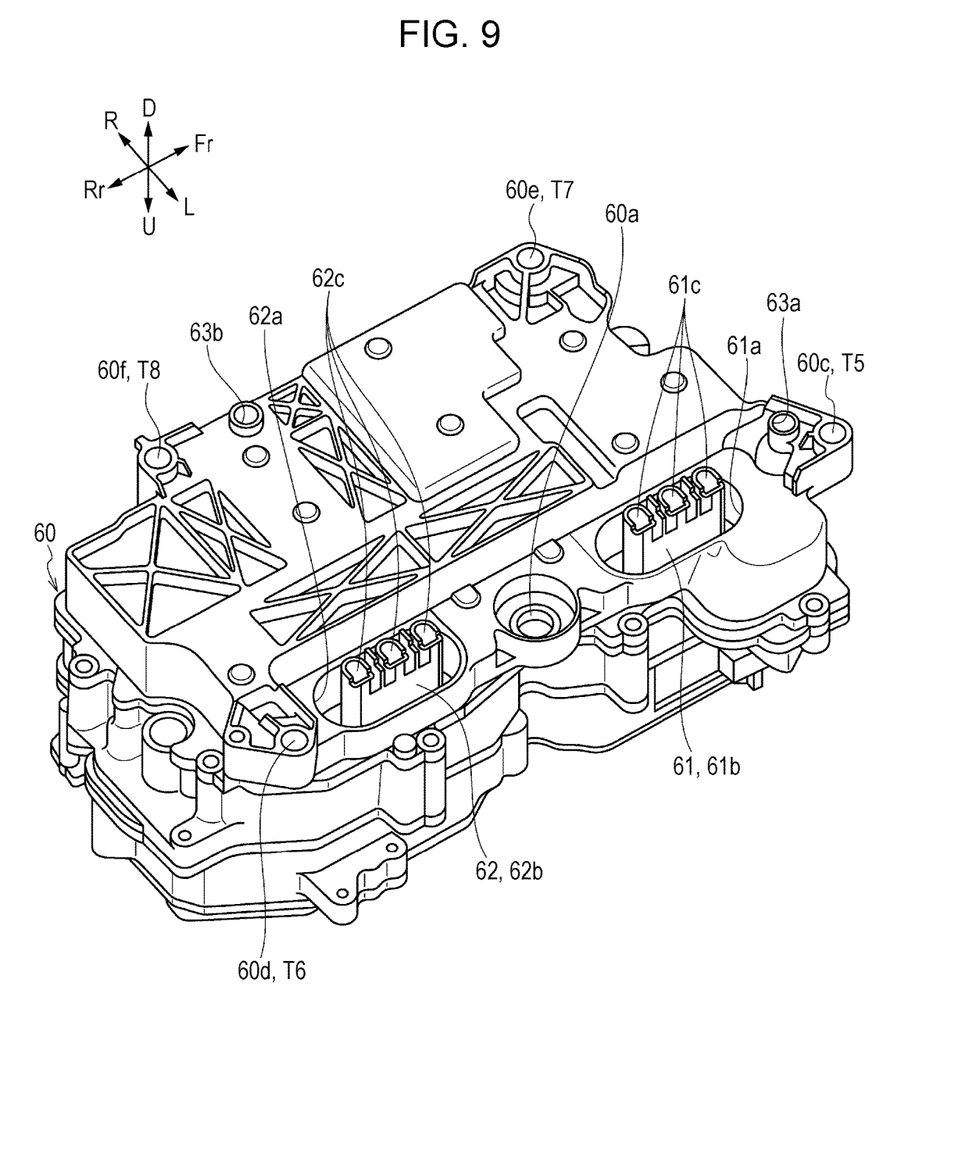
FIG. 9 is a perspective view showing a power control unit of a hybrid vehicle drive unit of FIG. 1, as viewed from the bottom.

As shown in FIGS. 4, 8, and 9, the power control unit 60 has a unit-side generator connector (controller connector) 61 and a unit-side motor connector (controller connector) 62 provided on a bottom thereof at a position offset from the center of gravity G of the power control unit 60, although details will be provided later. Control of the generator 20 and the electric motor 30 through the power control unit 60 can be accomplished by electrically coupling the unit-side generator connector 61 and the unit-side motor connector 62 to the casing-side generator connector 51 and the casing-side motor connector 52, respectively.

Specifically, the unit-side generator connector 61 and the unit-side motor connector 62 have connectors 61b, 62b that protrude into oval-shaped mating holes 61a, 62a that are fitted on the connectors 51a, 52a of the casing-side generator connector 51 and the casing-side motor connector 52 and that are fitted into the connectors 51a, 52a of the casing-side generator connector 51 and the casing-side motor connector 52 and inverter connecting portions 61e, 62e located in the unit casing 63. The connectors 61b, 62b and the inverter connecting portions 61e, 62e have three unit-side connecting conductors 66, 67 corresponding to the U, V, and W phases housed thereinside. Connector terminals 61c, 62c for the three phases formed at ends of the unit-side connecting conductors 66, 67 that come into contact with the connector terminals 51c, 52c of the casing-side generator connector 51 and the casing-side motor connector 52 are disposed in the connectors 61b, 62b, while inverter connecting terminals 61d, 62d formed at the other ends of the unit-side connecting conductors 66, 67 are disposed in the inverter connecting portions 61e, 62e.

As shown in FIG. 4, a comparison of the casing-side generator connector 51 and the casing-side motor connector 52 with the unit-side generator connector 61 and the unit-side motor connector 62 shows that a clearance L1 between the coil connecting terminals 51d, 52d on the opposite side of the connector terminals 61c, 62c of the unit-side generator connector 61 and the unit-side motor connector 62 in the casing-side connecting conductors 54, 55 of the casing-side generator connector 51 and the casing-side motor connector 52 is smaller than a clearance L2 between the inverter connecting terminals 61d, 62d on the opposite side of the connector terminals 51c, 52c of the casing-side generator connector 51 and the casing-side motor connector 52 in the unit-side connecting conductors 66, 67 of the unit-side generator connector 61 and the unit-side motor connector 62. With this arrangement, the casing-side generator connector 51 and the casing-side motor connector 52 can be reduced in size, whereby the entire hybrid vehicle drive unit 100 having the box-shaped unit casing 63 placed on the cylindrically-shaped drive unit casing 40 can be reduced in size.

As shown in FIGS. 1, 4, 5, and 10, the power control unit 60 is secured at electrical connection fixing point K5 to the connector supporting member 53 mounted on the drive unit casing 40 that supports the casing-side generator connector 51 and the casing-side motor connector 52. Specifically, an insertion/extraction bolt 60b is inserted through a through-hole 60a formed in the power control unit 60 (see FIG. 7A) and fastened to a fastening hole 53a formed in the connector supporting member 53, thereby forming the fixing point K5 for electrical connection between the power control unit 60 and the connector supporting member 53. The insertion/extraction bolt 60b has a function of ensuring that the connector terminals 51c, 52c of the casing-side generator connector 51 and the casing-side motor connector 52 are electrically connected to the connector terminals 61c, 62c of the unit-side generator connector 61 and the unit-side motor connector 62. The insertion/extraction bolt 60b being fastened to the fastening hole 53a will lead to a coupled state in which the connector terminals 51c, 52c of the casing-side generator connector 51 and the casing-side motor connector 52 are electrically coupled to the connector terminals 61c, 62c of the unit-side generator connector 61 and the unit-side motor connector 62.

Figure 5:
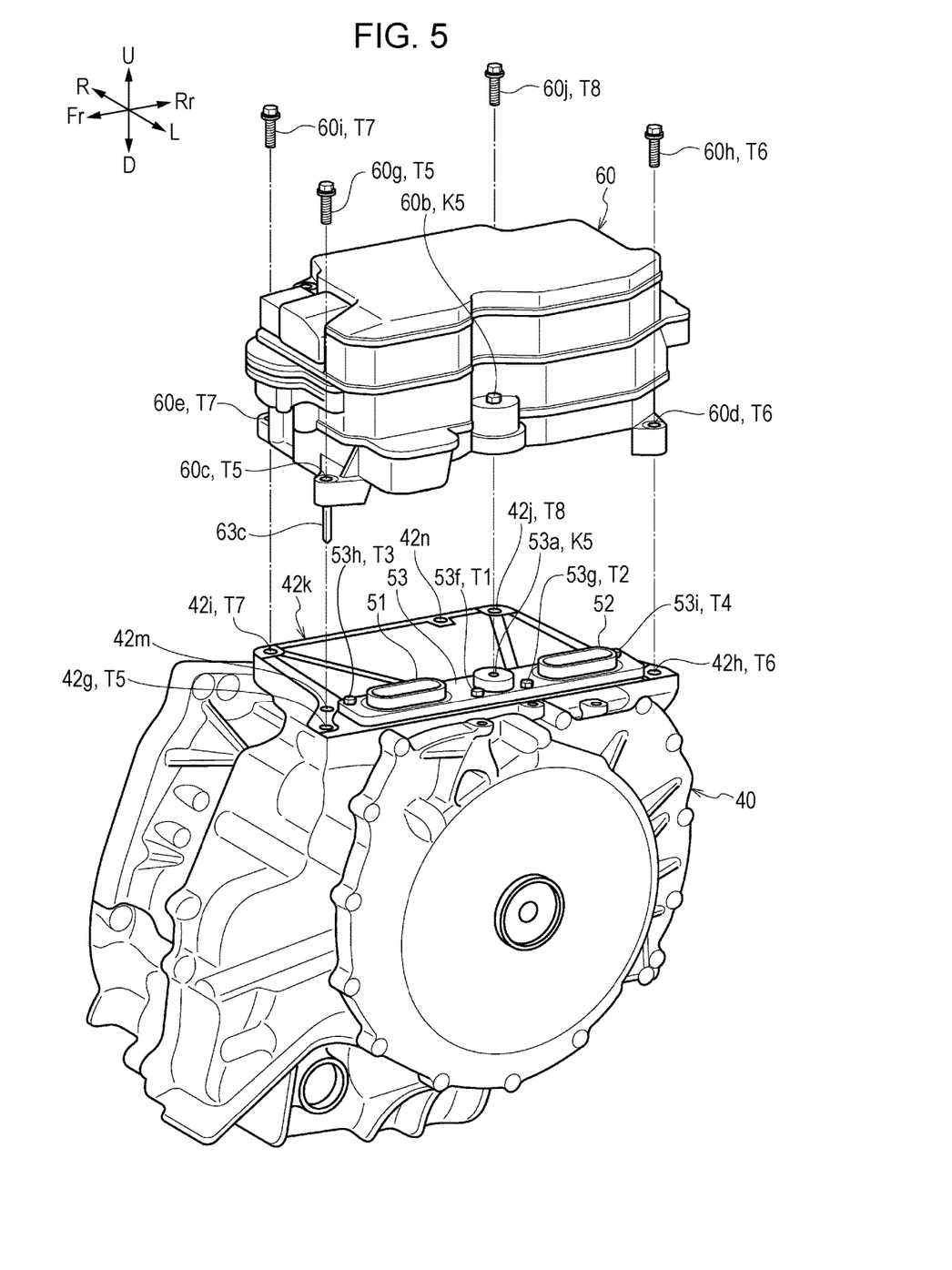
FIG. 5 is an exploded perspective view of a hybrid vehicle drive unit of FIG. 1.

Furthermore, as shown in FIGS. 5, 9, and 10, the power control unit 60 is secured to the drive unit casing 40 with at least four bolts. Specifically, bolts 60g, 60h, 60i, 60j are fastened to fastening holes 42g, 42h, 42i, 42j formed in the drive unit casing 40 through through-holes 60c, 60d, 60e, 60f formed in the power control unit 60, thereby forming bolt fastening points T5, T6, T7, T8 between the power control unit 60 and the drive unit casing 40. The bolts 60g, 60h, 60i, 60j have a function of ensuring that the power control unit 60 and the drive unit casing 40 are mechanically connected to each other. The bolts 60g, 60h, 60i, 60j being fastened to the fastening holes 42g, 42h, 42i, 42j will lead to a coupled state in which the power control unit 60 and the drive unit casing 40 are mechanically coupled to each other. Bosses in which the through-holes 60c, 60d, 60e, 60f are formed project slightly downward from the bottom surface of the power control unit 60 and are in contact with the drive unit casing 40. The four bolt fastening points T5, T6, T7, T8 are disposed so as to surround the casing-side generator connector 51 and the casing-side motor connector 52 in a rectangular shape. With this arrangement, the integration of the power control unit 60 and the drive unit casing 40 accomplished by bolt fastening improves the stiffness of the drive unit casing 40, thereby further deadening the vibrations of the drive unit casing 40.

As shown in FIGS. 5 through 7C, the drive unit casing 40 has a power control unit mounting portion 42k formed on a top surface thereof. The power control unit 60 allows only the bosses in which the through-holes 60c, 60d, 60e, 60f are formed to be in contact with the power control unit mounting portion 42k and, when mounted on the power control unit mounting portion 42k with a space therebetween, is secured by bolt fastening to the drive unit casing 40 and the connector supporting member 53.

Figure 6A:
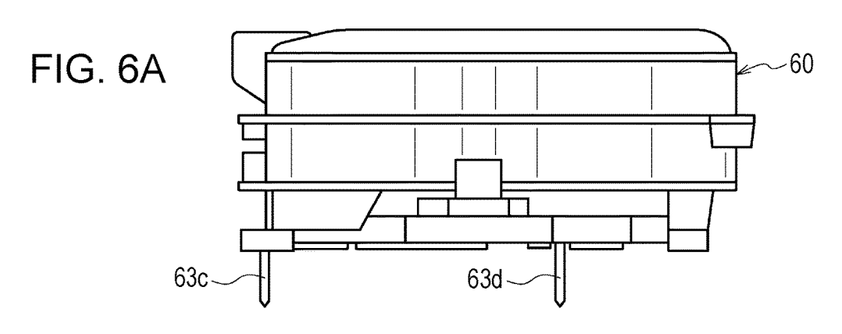
FIG. 6A is a side view of a power control unit.
Figure 6B:
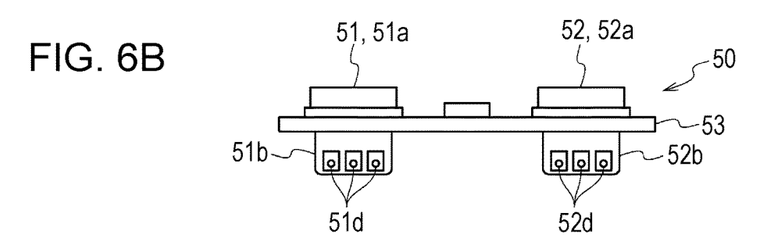
FIG. 6B is a side view of a casing-side connector.
Figure 6C:
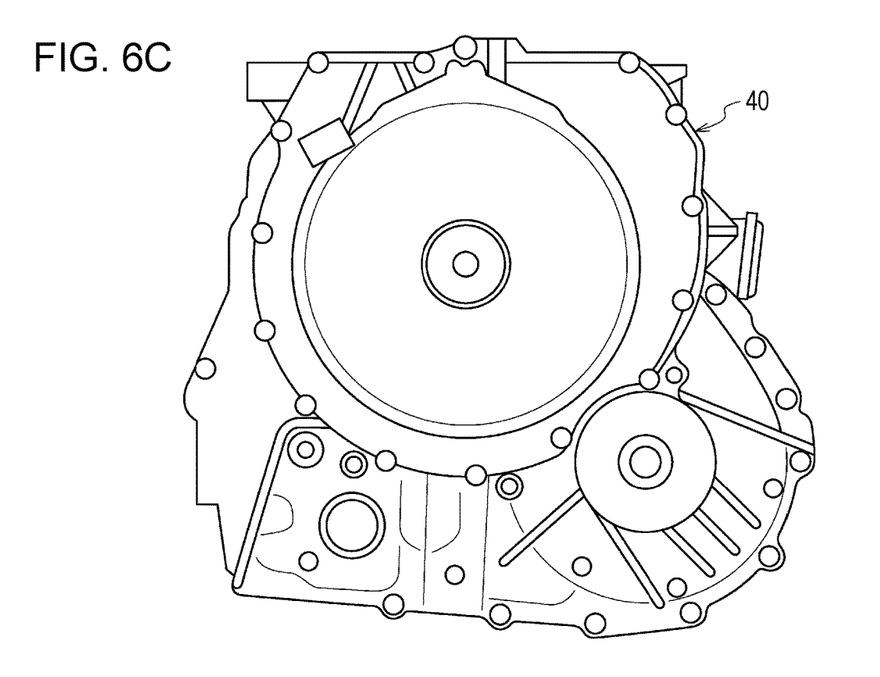
FIG. 6C is a side view of a drive unit casing.

In addition, as shown in FIG. 9, the power control unit 60 has guide pin fixing holes 63a, 63b formed in the vicinity of the through-hole 60c and the through hole 60f, into which guide pins 63c, 63d are screwed from the bottom surface side of the power control unit 60 (see FIG. 6A). The guide pins 63c, 63d projecting from the bottom surface of the power control unit 60 are inserted into guide holes 42m, 42n in the drive unit casing 40 when the power control unit 60 is placed onto the top surface of the drive unit casing 40 (see FIG. 5). The guide pins 63c, 63d and the guide holes 42m, 42n have a function of restricting a relative position between the power control unit 60 and the drive unit casing 40 and guiding the power control unit 60.

Guided by the guide pins 63c, 63d, the power control unit 60 according to the embodiment is mounted on the top surface of the drive unit casing 40 in such a manner that the unit-side generator connector 61 and the unit-side motor connector 62 disposed on the bottom surface of the power control unit 60 are directly connected to the casing-side generator connector 51 and the casing-side motor connector 52 disposed on the drive unit casing 40. In the hybrid vehicle drive unit 100 in which the power control unit 60 is mounted on the drive unit casing 40, the unit-side generator connector 61 and the unit-side motor connector 62 and the casing-side connectors 50 (the casing-side generator connector 51 and the casing-side motor connector 52) are disposed between the power control unit 60 and the drive unit casing 40 having the generator 20 and the electric motor 30 housed therein.

As shown in FIG. 10, the drive unit casing 40 is secured to a vehicle body frame 80 via a mounting member 70. The mounting member 70 includes a vehicle-side mounting member 71 secured to the vehicle body frame 80, a casing-side mounting member 72 secured to an upper outer end of the drive unit casing 40, and a vibration-deadening member (not illustrated) that couples the vehicle-side mounting member 71 and the casing-side mounting member 72 to each other. The vehicle-side mounting member 71 is secured to the vehicle body frame 80 with a bolt 71a, while the casing-side mounting member 72 is secured to the drive unit casing 40 with bolts 72a, 72b, 72c.

The bolt 71a is fastened to a fastening hole (not illustrated) formed in the vehicle body frame 80 via a through-hole (not illustrated) formed in the vehicle-side mounting member 71, thereby forming a fixing point K1 between the mounting member 70 and the vehicle body frame 80, while the bolts 72a, 72b, 72c are fastened to fastening holes 43a, 43b, 43c (see FIGS. 1 and 7C) formed in the drive unit casing 40 via a through-hole (not illustrated) formed in the casing-side mounting member 72, thereby forming fixing points K2, K3, K4 between the mounting member 70 and the drive unit casing 40. The drive unit casing 40 is secured at another portion thereof to the vehicle body frame 80 via a mounting member 70, but descriptions of such other portions are omitted.

With reference to FIG. 10, a positional relationship between the unit-side generator connector 61 and the unit-side motor connector 62 and the casing-side connectors 50 (the casing-side generator connector 51 and the casing-side motor connector 52) will be detailed below. Two-dot lines shown in FIG. 10 indicate an outer shape of the power control unit 60 mounted on the drive unit casing 40, as viewed from the vertical direction, while point G indicates the center of gravity of the power control unit 60. Dashed lines in FIG. 10 indicate the unit-side generator connector 61 and the unit-side motor connector 62.

As is evident from FIG. 10, the unit-side generator connector 61 and the unit-side motor connector 62 and the casing-side generator connector 51 and the casing-side motor connector 52, as viewed from the vertical direction, are disposed within area AR through which passes line segment X perpendicular to virtual line IL connecting the center of gravity G of the power control unit 60 and the insertion/extraction bolt 60b (fastening hole 53a). The area AR is provided between a first line segment X1 to a second line segment X2 that are parallel to the line segment X. In this embodiment, the virtual line IL is configured to coincide with the axis of rotation O of the rotor 21 of the generator 20 and the rotor 31 of the electric motor 30. As described above, through the deposition of the unit-side generator connector 61 and the unit-side motor connector 62 and the casing-side generator connector 51 and the casing-side motor connector 52 within area AR through which passes line segment X perpendicular to virtual line IL connecting the center of gravity G of the power control unit 60 and the insertion/extraction bolt 60b (fastening hole 53a), the unit-side generator connector 61 and the unit-side motor connector 62 and the casing-side generator connector 51 and the casing-side motor connector 52 are subjected at one end (right side in this embodiment) to a gravitational force of the power control unit 60 that is exerted in a downward direction and are subjected at the other end (left side in this embodiment) to a fastening force of the insertion/extraction bolt 60b that is exerted in a downward direction, thereby strongly maintaining the coupling between the unit-side generator connector 61 and the unit-side motor connector 62 and the casing-side generator connector 51 and the casing-side motor connector 52.

As described above, the casing-side generator connector 51 and the casing-side motor connector 52, as viewed from the vertical direction, are disposed such that the axis of rotation O of the rotor 21 of the generator 20 and the rotor 31 of the electric motor 30 lies therebetween. In conjunction with this, the unit-side generator connector 61 and the unit-side motor connector 62 that are electrically connected to the casing-side generator connector 51 and the casing-side motor connector 52 are also longitudinally disposed such that the axis of rotation O of the rotor 21 of the generator 20 and the rotor 31 of the electric motor 30 lies therebetween. In addition, the casing-side generator connector 51 and the casing-side motor connector 52, when viewed from the direction of the axis, are disposed so as to lie along tangent line Q passing through the upper end of the generator 20 and the electric motor 30. In conjunction with this, the unit-side generator connector 61 and the unit-side motor connector 62 that are electrically connected to the casing-side generator connector 51 and the casing-side motor connector 52 are also disposed along the tangent line Q. Accordingly, the load of the power control unit 60 is equally exerted on the axis of rotation O.

Furthermore, the guide pins 63c, 63d and the two guide holes 42m, 42n through which the two guide pins 63c, 63d are inserted are opposed to each other with the center of gravity G of the power control unit 60 therebetween, namely, the guide pins 63c, 63d and the two guide holes 42m, 42n through which the two guide pins 63c, 63d are inserted are located at diagonal positions in four areas divided by the virtual line IL (axis of rotation O) and the line segment X passing through the center of gravity G of the power control unit 60 and being perpendicular to virtual line IL. Accordingly, the guide pins 63c, 63d and the guide holes 42m, 42n enable the installation of the power control unit 60 in the drive unit 101 with the position of the power control unit 60 maintained.

As described above, in this embodiment, the unit-side generator connector 61 and the unit-side motor connector 62 and the casing-side generator connector 51 and the casing-side motor connector 52, as viewed from the vertical direction, are disposed within the area AR through which passes the line segment X perpendicular to the virtual line IL connecting the center of gravity G of the power control unit 60 and the insertion/extraction bolt 60b. Accordingly, a gravitational force exerted on the power control unit 60 and a fastening force of the insertion/extraction bolt 60b strongly maintain the coupling between the unit-side generator connector 61 and the unit-side motor connector 62 and the casing-side generator connector 51 and the casing-side motor connector 52.

Since the unit-side generator connector 61 and the unit-side motor connector 62 and the casing-side generator connector 51 and the casing-side motor connector 52 are disposed such that the axis of rotation O of the rotor 21 of the generator 20 and the rotor 31 of the electric motor 30 lies therebetween, as viewed from the vertical direction, and to be along the tangent line Q passing through the upper end of the generator 20 and the electric motor 30, as viewed from the direction of the axis, the load of the power control unit 60 is equally exerted on the axis of rotation O.

In addition, since the clearance L1 between the coil connecting terminals 51d, 52d in the casing-side connecting conductors 54, 55 of the casing-side generator connector 51 and the casing-side motor connector 52 is smaller than the clearance L2 between the inverter connecting terminals 61d, 62d in the unit-side connecting conductors 66, 67 of the unit-side generator connector 61 and the unit-side motor connector 62, the entire hybrid vehicle drive unit 100 having the box-shaped unit casing 63 placed on the cylindrically-shaped drive unit casing 40 can be reduced in size.

Furthermore, since the guide pins 63c, 63d and the two guide holes 42m, 42n are opposed to each other with the center of gravity G of the power control unit 60 therebetween to help mount the power control unit 60 on the drive unit 101, the power control unit 60 can be mounted on the drive unit 101 with the position of the power control unit 60 maintained.

The present application is typically described with reference to, but not limited to, the foregoing embodiments. Various modifications are conceivable within the scope of the present application. The above embodiment describes the hybrid vehicle drive unit 100 as an example of the integrated unit which includes the drive unit 101 having the drive unit casing 40 that has the generator 20 and the electric motor 30 housed therein, the engine 4, and the power control unit 60 that is mounted on the drive unit casing 40 having the generator 20 and the electric motor 30 housed therein to control the generator 20 and the electric motor 30, but is not limited to this. The integrated unit may be a vehicle drive unit that is structured independently of the engine or has no engine provided therein.

The above embodiment describes the drive unit 101 having the generator 20 and the electric motor 30 housed therein as a controlled unit (drive device), but the drive unit 101 does not necessarily include both and may include any one of or both the generator functions and motor functions of electric rotating machines. In addition, the integrated unit is not limited to types of integrated units designed for vehicles and the integrated unit may be an integrated unit for other transportation machines. The number of the guide pins

63c, 63d/guide holes 42m, 42n as guides is not limited to two. Three or more guide pins/guide holes may be provided. In this case, at least two may be opposed to each other with the center of gravity G of the power control unit 60 therebetween.

A first aspect of the present application provides an integrated unit (for example, a hybrid vehicle control unit 100 in an embodiment to be described later) which includes a control unit (for example, a power control unit 60 in the embodiment) having a control unit connector (for example, a unit-side generator connector 61 or a unit-side electric motor connector 62 in the embodiment) and a controlled unit (for example, a drive unit 101 in the embodiment) that has a controlled unit connector (for example, a casing-side connector 50 in the embodiment) to be fitted into the control unit connector and is electrically coupled to the control unit by causing the control unit connector and the controlled unit connector to be fitted into each other, the control unit connector and the controlled unit connector being disposed between the control unit and the controlled unit and the control unit being disposed on a top surface of the controlled unit, in which the control unit and the controlled unit are held in a coupled state where electrical coupling is accomplished by a fastening supporting member (for example, an insertion/extraction bolt 60b in the embodiment), and in which at least part of the control unit connector and the controlled unit connector, as viewed from a vertical direction, is disposed within an area (for example, an area AR in the embodiment) through which a line segment (for example, a line segment X in the embodiment) passes, the line segment being perpendicular to a virtual line (for example, a virtual line IL in the embodiment) connecting a center of gravity (for example, a center of gravity G in the embodiment) of the control unit and the fastening supporting member. With this arrangement, a gravitational force that is exerted on the control unit and a fastening force of the fastening supporting member strongly maintain coupling between the control unit connector and the controlled unit connector.

A second aspect of the present application provides the integrated unit of the first aspect, in which the control unit may include a box-shaped control unit casing (for example, a unit casing 63 in the embodiment) and a first control unit connector (for example, a unit-side generator connector 61 in the embodiment) and a second control unit connector (for example, a unit-side motor connector 62 in the embodiment) that are provided in the control unit casing so as to constitute the control unit connector, in which the controlled control unit may include an electric rotating machine (for example, an electric motor 30 or a generator 20 in the embodiment) having a rotor (for example, a rotor 31 or a rotor 21 in the embodiment) and a stator (for example, a stator 32 or a stator 22 in the embodiment) disposed so as to be opposed to each other, a substantially cylindrically-shaped electric rotating machine casing (for example, a drive unit casing 40 in the embodiment) that has the electric rotating machine housed therein, and a first controlled unit connector (for example, a casing-side generator connector 51 in the embodiment) and a second controlled unit connector (for example, a casing-side motor connector 52 in the embodiment) that are provided on a circumferential surface of the electric rotating machine casing so as to constitute of the controlled unit connector, in which the first control unit connector and the second control unit connector as well as the first controlled unit connector and the second controlled unit connector, as viewed from a vertical direction, may be disposed such that an axis of rotation (for example, an axis of rotation O in the embodiment) of the rotor is therebetween, and in which the first control unit connector and the second control unit connector as well as the first controlled unit connector and the second controlled unit connector, as viewed from the axis of rotation, may be disposed along a tangent line (for example, a tangent line Q in the embodiment) passing through an upper end of the electric rotating machine. With this arrangement, the load of the control unit is equally exerted on the axis of rotation.

A third aspect of the present application provides the integrated unit of the first or second aspect, in which the control unit connector and the controlled unit connector each may have three connecting conductors (for example, a unit-side connecting conductors 66, 67 or casing-side connecting conductors 54, 55 in the embodiment) that correspond to U, V, and W phases, and in which a clearance (for example, a clearance L1 in the embodiment) between connecting terminals (for example, coil connecting terminals 51d, 52d in the embodiment) on the opposite side of connecting terminals (for example, connector terminals 61c, 62c in the embodiment) of the control unit connector in the connecting conductors (for example, casing-side connecting conductors 54, 55 in the embodiment) of the controlled unit connector may be smaller than a clearance (for example, a clearance L2 in the embodiment) between the connecting terminals (for example, inverter connecting terminals 61d, 62d in the embodiment) on the opposite side of the connecting terminals (for example, connector terminals 51c, 52c in the embodiment) of the controlled unit connector in the connecting conductors (for example, unit-side connecting conductors 66, 67 in the embodiment) of the control unit connector. With this arrangement, since the controlled unit connector can be formed into a compact size, the entire integrated unit having the box-shaped control unit casing mounted on the cylindrically-shaped electric motor casing can be reduced in size.

A fourth aspect of the present application provides the integrated unit of any one of the first to third aspects, in which at least two guiding portions (for example, guide pins 63c, 63d and guide holes 42m, 42n in the embodiment) may be provided that guide the control unit when the control unit is mounted on the controlled unit and in which the at least two guiding portions may be opposed to each other such that the center of gravity of the control unit is therebetween. With this arrangement, the control unit can be mounted on the controlled unit with the position of the control unit maintained.

Obviously, numerous modifications and variations of the present invention are possible in light of the above teachings. It is therefore to be understood that within the scope of the appended claims, the invention may be practiced otherwise than as specifically described herein.

What is claimed is:

1. An integrated unit comprising:
   a control unit having a control unit connector; and
   a controlled unit that has a controlled unit connector to be fitted into the control unit connector and is electrically coupled to the control unit by causing the control unit connector and the controlled unit connector to be fitted into each other, the control unit connector and the controlled unit connector being disposed between the control unit and the controlled unit and the control unit being disposed on a top surface of the controlled unit,
   wherein the control unit and the controlled unit are held in a coupled state in which electrical coupling is accomplished by a fastening supporting member;

wherein at least part of the control unit connector and the controlled unit connector, as viewed from a vertical direction, is disposed within an area through which a line segment passes, the line segment being perpendicular to a virtual line connecting a center of gravity of the control unit and the fastening supporting member, the area being provided between the center of gravity and the fastening supporting member in a direction along the virtual line as viewed from the vertical direction, wherein the controlled unit includes an electric rotating machine having a rotor and a stator opposite to the rotor, and wherein the area overlaps the electric rotating machine as viewed from the vertical direction.

2. The integrated unit according to claim 1, wherein the control unit includes a box-shaped control unit casing and a first control unit connector and a second control unit connector that are provided in the control unit casing so as to constitute the control unit connector;

wherein the controlled unit includes an electric rotating machine having a rotor and a stator disposed so as to be opposed to each other, a substantially cylindrically-shaped electric rotating machine casing that has the electric rotating machine housed therein, and a first controlled unit connector and a second controlled unit connector that are provided on a circumferential surface of the electric rotating machine casing so as to constitute the controlled unit connector;

wherein the first control unit connector and the second control unit connector as well as the first controlled unit connector and the second controlled unit connector, as viewed from a vertical direction, are disposed such that an axis of rotation of the rotor is therebetween; and wherein the first control unit connector and the second control unit connector as well as the first controlled unit connector and the second controlled unit connector, as viewed from the axis of rotation, are disposed along a tangent line passing through an upper end of the electric rotating machine.

3. The integrated unit according to claim 1, wherein the control unit connector and the controlled unit connector each have three connecting conductors that correspond to U, V, and W phases; and wherein a clearance between connecting terminals on the opposite side of connecting terminals of the control unit connector in the connecting conductors of the controlled unit connector is smaller than a clearance between the connecting terminals on the opposite side of the connecting terminals of the controlled unit connector in the connecting conductors of the control unit connector.

4. The integrated unit according to claim 1, wherein at least two guiding portions are provided that guide the control unit when the control unit is mounted on the controlled unit; and wherein the at least two guiding portions are opposed to each other such that the center of gravity of the control unit is therebetween.

5. The integrated unit according to claim 1, wherein the top surface of the controlled unit is substantially orthogonal to the vertical direction.

6. The integrated unit according to claim 1, wherein the area extends in parallel to the top surface of the controlled unit.

7. The integrated unit according to claim 1, wherein the fastening supporting member is inserted through a through-hole provided in the control unit and fastened to a fastening hole provided in the controlled unit.

8. An integrated system comprising:

a controller having a controller connector;

a drive device having a top surface on which the controller is disposed, the drive device having a drive device connector which is connected to the controller connector so that the drive device is electrically coupled to the controller, the controller connector and the drive device connector being disposed between the controller and the drive device; and a fastening supporting member via which the controller and the drive device are maintained in an electrically coupled state in which the drive device connector is connected to the controller connector, at least part of the controller connector and the drive device connector, as viewed from a vertical direction, being disposed within an area from a first line segment which is perpendicular to a virtual line connecting a center of gravity of the controller and the fastening supporting member and which passes the center of gravity to a second line segment which is perpendicular to the virtual line and which passes the fastening supporting member, wherein the drive device includes an electric rotating machine having a rotor and a stator opposite to the rotor, and wherein the area overlaps the electric rotating machine as viewed from the vertical direction.

9. The integrated system according to claim 8, wherein the controller includes a box-shaped controller casing and a first controller connector and a second controller connector that are provided in the box-shaped controller casing so as to constitute the controller connector;

wherein the drive device includes an electric rotating machine having a rotor and a stator disposed so as to be opposed to each other, a substantially cylindrically-shaped electric rotating machine casing that has the electric rotating machine housed in the substantially cylindrically-shaped electric rotating machine casing, and a first drive device connector and a second drive device connector that are provided on a circumferential surface of the substantially cylindrically-shaped electric rotating machine casing so as to constitute the drive device connector;

wherein the first controller connector, the second controller connector, the first drive device connector, and the second drive device connector, as viewed from the vertical direction, are disposed such that an axis of rotation of the rotor is between the first controller connector and the second controller connector and between the first drive device connector and the second drive device connector; and wherein the first controller connector, the second controller connector, the first drive device connector, and the second drive device connector, as viewed from the axis of rotation, are disposed along a tangent line passing through an upper end of the electric rotating machine.

10. The integrated system according to claim 9, wherein the electric rotating machine comprises a generator and an electric motor which are housed in the substantially cylindrically-shaped electric rotating machine casing so as to be arranged on the axis of rotation of the rotor; and wherein the first drive device connector and the second drive device connector are disposed between a center of the generator and a center of the electric motor in a direction of the axis of rotation of the rotor.

11. The integrated system according to claim 8,
wherein the controller connector and the drive device connector each have three connecting conductors that correspond to U, V, and W phases; and
wherein a clearance between first connecting terminals on an opposite side of second connecting terminals of the controller connector in the three connecting conductors of the drive device connector is smaller than a clearance between the second connecting terminals on an opposite side of the first connecting terminals of the drive device connector in the three connecting conductors of the controller connector.

12. The integrated system according to claim 8,
wherein at least two guiding portions are provided to guide the controller in a case where the controller is mounted on the drive device; and
wherein the at least two guiding portions are opposed to each other such that the center of gravity of the controller is between the at least two guiding portions.

13. The integrated system according to claim 8, wherein the top surface of the drive device is substantially orthogonal to the vertical direction.

14. The integrated system according to claim 8, wherein the area extends in parallel to the top surface of the drive device.

15. The integrated system according to claim 8, wherein the fastening supporting member is inserted through a through-hole provided in the controller and fastened to a fastening hole provided in the drive device.

16. An integrated system comprising: a controller having a controller connector;
a drive device having a top surface on which the controller is disposed, the drive device having a drive device connector which is connected to the controller connector so that the drive device is electrically coupled to the controller, the controller connector and the drive device connector being disposed between the controller and the drive device; and
a fastening supporting member via which the controller and the drive device are maintained in an electrically coupled state in which the drive device connector is connected to the controller connector, at least part of the controller connector and the drive device connector, as viewed from a vertical direction, being disposed within an area from a first line segment which is perpendicular to a virtual line connecting a center of gravity of the controller and the fastening supporting member and which passes the center of gravity to a second line segment which is perpendicular to the virtual line and which passes the fastening supporting member,
wherein the fastening supporting member is inserted through a through-hole provided in the controller and fastened to a fastening hole provided in the drive device,
wherein the drive device includes an electric rotating machine having a rotor and a stator opposite to the rotor, and
wherein the area overlaps the electric rotating machine as viewed from the vertical direction.

* * * * *